(12) United States Patent
Klassen et al.

(10) Patent No.: US 8,510,471 B2
(45) Date of Patent: Aug. 13, 2013

(54) DEVICE TRANSFER OF A SERVER STORED DATA ITEM BASED ON ITEM ID AND DETERMINED NATURE OF INTENDED DESTINATION

(75) Inventors: Gerhard Dietrich Klassen, Waterloo (CA); Shaul S. Wisebourt, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1110 days.

(21) Appl. No.: 11/454,840

(22) Filed: Jun. 19, 2006

(65) Prior Publication Data

US 2007/0294429 A1 Dec. 20, 2007

(51) Int. Cl.
*G06F 15/16* (2006.01)
*H04L 29/12* (2006.01)
(52) U.S. Cl.
CPC .............................. *H04L 29/12066* (2013.01)
USPC ......................................................... 709/245
(58) Field of Classification Search
USPC .................... 709/217, 219, 245–247; 707/1, 707/10
See application file for complete search history.

(56) References Cited

U.S. PATENT DOCUMENTS

| 5,893,140 | A | * | 4/1999 | Vahalia et al. ................. 711/118 |
| 6,052,785 | A | * | 4/2000 | Lin et al. ............................ 726/5 |
| 6,167,490 | A | * | 12/2000 | Levy et al. ..................... 711/148 |
| 6,324,581 | B1 | * | 11/2001 | Xu et al. ......................... 709/229 |
| 6,886,013 | B1 | * | 4/2005 | Beranek .......................... 707/10 |
| 6,901,437 | B1 | | 5/2005 | Li |
| 2002/0056010 | A1 | | 5/2002 | Lincoln et al. |
| 2003/0061350 | A1 | * | 3/2003 | Masuoka et al. .............. 709/225 |
| 2003/0187952 | A1 | * | 10/2003 | Young et al. ................... 709/219 |
| 2003/0191858 | A1 | | 10/2003 | Adsumilli |
| 2003/0195974 | A1 | * | 10/2003 | Ronning et al. ............... 709/230 |
| 2005/0267863 | A1 | * | 12/2005 | Carpentier et al. ................ 707/1 |

FOREIGN PATENT DOCUMENTS

WO  WO 2004010306 A1 *  1/2004

OTHER PUBLICATIONS

Extended Search Report from European Application No. 06115684.0 dated Nov. 28, 2006.

* cited by examiner

*Primary Examiner* — Peter Shaw
(74) *Attorney, Agent, or Firm* — Brett J. Slaney; Blake, Cassels & Graydon LLP

(57) ABSTRACT

There is provided a method and system for communicating data items about a communication network. An original data item for communicating to a destination device is cached to a network data store in association with unique ID (UID) generated to identify the original data item. The UID is then sent as a proxy for the original data item to the destination device. The original data item may be processed (e.g. in response to a type of the destination device) to create a processed data item and the processed data item sent in place of the original data item. The processed data item may also be cached in association with the UID, for example, for reuse to eliminate duplicate processing. The destination device is adapted to return the UID when further communicating the original data item thereby to reduce communication of the original data item about the communication network.

21 Claims, 5 Drawing Sheets

DEVICE TRANSFER OF A SERVER STORED DATA ITEM BASED ON ITEM ID AND DETERMINED NATURE OF INTENDED DESTINATION

FIELD

The present application relates to electronic data communications, in particular, communicating data items from one data communications device to another via an intermediate server.

BACKGROUND

Electronic data communications between users, such as electronic mail (email), instant messaging (IM), short message service (SMS) and the like is increasingly popular. Often, users wish to communicate data items (i.e. files) to one another including images, video or audio clips, text or word processing documents, etc. However, some user devices such as handheld electronic devices (e.g. mobile telephones, personal digital assistants (PDAs), MP3 players, etc.) and particularly those communicating via wireless communication networks are more sensitive to resource limitations.

When developing software for such handheld devices, there are a number of limitations that may be taken into consideration in order to make handheld device operations fast and efficient. Limited memory resources, communication bandwidth, and battery power consumption is only a shortlist of issues handheld software developers have to think about.

One of the solutions to reducing resource consumption is to reduce the amount of data to be passed to and/or stored by the handheld device. For example, image files may undergo processing or conversion with a view to compressing the size of the image data. Often such treatment reduces a quality of the image. Also it demands image conversion every time the same image is sent/forwarded to a handheld device providing an extra load on the server executing the file processing. Another problem arises when an image that was specifically converted for a handheld device gets forwarded to a recipient (by e-mail, for example), who uses a desktop communication device: the reduced quality image arrives rather than the original image, although the recipient is capable of viewing a better quality image.

A solution that addresses one or more of these issues is therefore desired.

BRIEF DESCRIPTION OF THE DRAWINGS

In order that the subject matter may be readily understood, embodiments are illustrated by way of examples in the accompanying drawings, in which.

DETAILED DESCRIPTION

There is provided a method and system (among other aspects) for communicating data items about a communication network. An original data item for communicating to a destination device is cached to a network data store in association with unique ID (UID) generated to identify the original data item. The UID is then sent as a proxy for the original data item to the destination device. The original data item may be processed (e.g. in response to a type of the destination device) to create a processed data item and the processed data item sent in place of the original data item. The processed data item may also be cached in association with the UID, for example, for reuse to eliminate duplicate processing. The destination device is adapted to return the UID when further communicating the original data item thereby to reduce communication of the original data item about the communication network.

Figure 1:
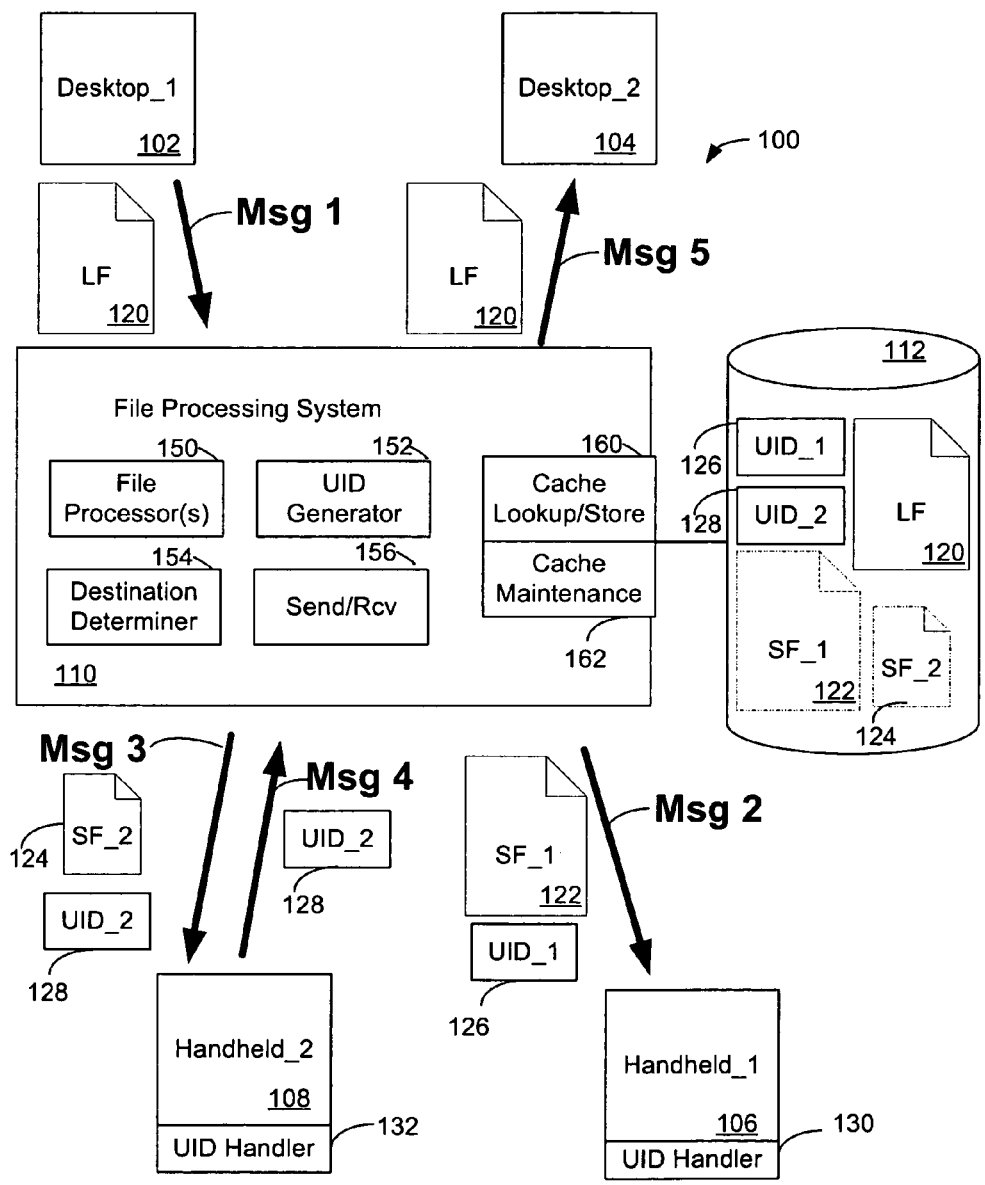
FIG. 1 is a block diagram which illustrates pertinent components of a file processing system and handheld devices adapted in accordance with an embodiment and an example message flow.

FIG. 1 illustrates pertinent components of an electronic data communication system 100 for communicating data items such as image, video and/or audio files (e.g. 120, 122 and 124) between users of various electronic data communication devices (102, 104, 106 and 108) having varying processing, storing, displaying and/or communicating capabilities as described below. In the illustrated embodiment, a representative file processing system 110 is interposed between the user devices 102, 104, 106 and 108 for processing the data communications and data files.

Persons of skill in the art will appreciate that various wireless and wired network infrastructure is not shown. For example, devices 102 and 104 in the example of FIG. 1 comprise "desktop" data communication devices such as PC's, laptops, workstations, or other similar devices characterized by their relatively powerful processors, plentiful storage and large screen displays when compared to handheld devices 106 and 108. Desktop devices 102 (desktop_1) and 104 (desktop_2) may be configured to communicate with file processing system 110 via high speed networks such as wired networks (LANs, WANs, public and/or private) that may include short range wireless networks (e.g. Wi-Fi, etc.). Devices 102 and 104 may be coupled via emerging high speed wireless networks such as satellite, microwave or other technology providing high-bandwidth at relatively comparable costs to conventional wired networks.

In contrast, handheld devices 106 and 108 comprise devices such a cellular telephones, PDAs, etc. characterized by one or more resource limitations or costs related to processor speed, memory/storage size or latency, display size and network communication speed or expense (e.g. charges per unit transmitted). In the present embodiment, handheld devices 106 (handheld_1) and 108 (handheld_2) typically communicate with file processing system 110 via a data network which comprises one or more wireless communication networks (GSM/GPRS, CDMA, 3G, etc.).

File processing system 110 comprises a computer server coupled to a data store 112 configured to receive data communications (messages) from a source for delivery to one or more destinations. File processing system 110 may be a component in the communication network that relays network traffic and is capable of modifying packets based on application logic. The data communications may include one or more data items or files. File processing system 110 may process the files to generate processed data items in response to the destination, such as to reduce file size or convert to a compatible file type, etc. to meet the needs of the destination or reduce bandwidth etc. as described. Additionally, file processing system 110 may store the file (or any file location if the file is available to the file processing system via a network) and assign the file a unique ID (UID), which UID is sent to the destination with the processed data item (file) as applicable. Destinations not requiring processing of a file need not receive the UID or a processed file.

File processing system 110 comprises one or more file processors/converters 150, a UID generator 152, a destination determiner 154 and send/receive mechanisms (e.g. queues) 156. File processing system 110 is communicatively coupled to a cache 112 (e.g. a data store) for storing files (or file locations) from messages (e.g. LF 120) and UIDs (e.g. UID_1 126 and UID_2 128) and, optionally, processed files (e.g. SF_1 122 and SF_2 124). File processing system 110 comprises a cache lookup and store module 160 for accessing cache data and a cache maintenance module 162 for maintaining cache data, such as deleting stored files and/or UIDs in accordance with a cache scheme. File processing systems further comprises instructions and data implementing operations for file processing, using the file processors/converters 150, UID generator 152, destination determiner 154, send/receive mechanisms 156 and cache modules 60 and 162 described by way of examples further below.

Destination devices receiving the forwarded message with a UID in association with a processed file (e.g. handheld_1, 106 and handheld_2, 108) may be adapted to comprise a UID handler 130 and 132 for handling the UIDs as described further herein below.

FIG. 1 further illustrates an example message flow among the users of various electronic data communication devices (102, 104, 106 and 108). In the example, user of device 102 sends a message Msg_1 including a large file LF 120 to two destinations, namely the respective users of handheld_1 106 and handheld_2 108. Msg_1 is routed via file processing system 110. File processing system 110 receives the message via send/receive mechanism 156 and analyzes Msg_1 to determine the processing requirements for each of the destinations (106 and 108) using the destination determiner 154. A cache lookup (160) may be performed to see if LF was previously processed and cached with a processed file required for a destination.

If LF 120 was previously stored with a processed file required by the destination, the converted file may be returned from the cache to reduce processing by file processing system 110. In this example, LF 120 has not been stored before its receipt with Msg 1.

For handheld_1 106, an appropriate file processor 150 creates SF_1 122 in response to LF. UID generator 152 generates a first UID 126 for LF 120. LF 120 and optionally SF_1 122 are stored to cache 112 via cache lookup/store 160. File processing system 110 routes a message, Msg 2, to handheld_1 106 comprising the message of Msg 1 and SF_1 122 and UID_1 126.

File processing system 110 follows similar steps for the remaining destination, namely handheld_2 108. SF_2 124 is generated in response to the requirements of handheld_2 108. Persons of skill in the art will understand that if the handhelds are of the same type (i.e. have the same capabilities or requirements for file LF) then SF_1 may be used rather than generating a second file SF_2. A second UID, UID_2 128, is generated for LF and it and optionally SF_2 are stored to cache 112. As LF 120 is already stored, it need not be stored twice. A single common UID may be used for LF rather than one per message. File processing system 110 generates Msg_3 for handheld_2 108 including SF_2 124 and UID_2 128 and communicates it via send/receive mechanisms 156.

In this example, the user of handheld_2 108 desires to send LF to a user of desktop_2 (e.g. by forwarding Msg 3 or by other means such as defining a new message and including file LF). The user of handheld_2 may consider SF_2 124 to be LF 120 transparently. Handheld_2 and UID handler 132 cooperate to define a message, Msg 4, including UID_2 as a proxy for LF 120 to send via file processing system 110 for desktop_2 104. Sending only UID_2 saves network bandwidth and processing resource consumption by various components in the network.

File processing system 110 receives Msg 4 and looks in cache 112 for LF 120 using UID_2. Destination determiner 154 determines no processing is required for desktop_2 104. File processing system 110 defines a message, Msg 5 from Msg 4 and includes LF 120 from the cache, sending it via mechanism 156.

File processing system cache 112 resources are limited and there is a limit to the files that can be cached. Cache 112 can be maintained via cache maintenance module 162. Cache 112 may be cleared based on date information, or last access date, or on the frequency of the file being forwarded, or any other low memory management rule set. Optionally a user may be assigned a specific amount cache storage space and files stored to the cache may be stored in association with user information. Cache maintenance schemes may be responsive to such user assigned space limits as well.

Figure 2:
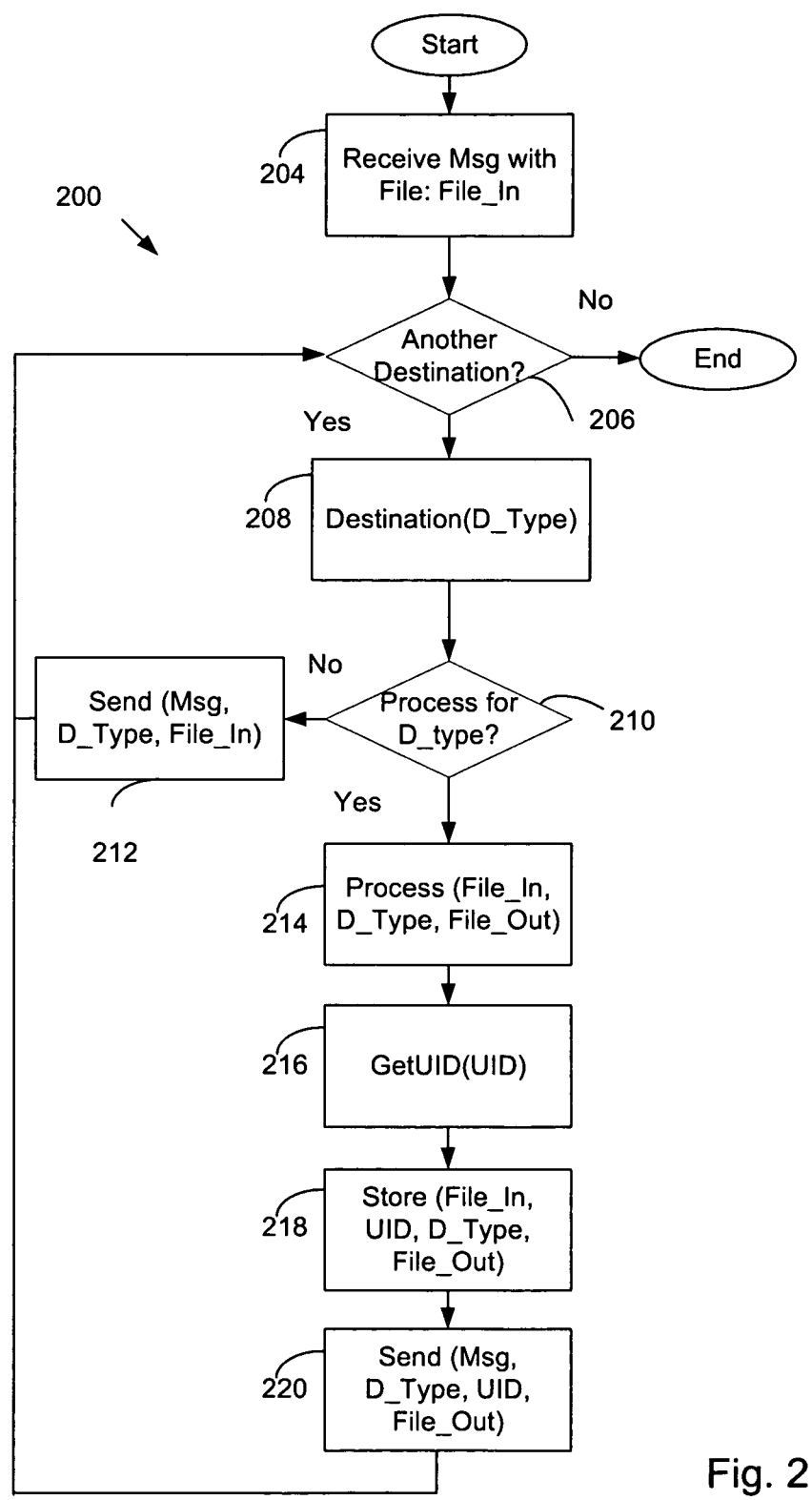
FIG. 2 is a flowchart of operations, in accordance with an embodiment, to communicate a message including a file.

FIG. 2 is a flowchart showing example operations 200 to communicate a message received with a file.

At step 204, the message is received including a file, File_In. The message also includes at least one destination. In accordance with the present embodiment, steps 206-220 define a loop for operations that are performed, as applicable, for each of the destinations. Operations 200 end following a branch from step 206 once all destinations are handled. At step 208, the type of destination D_Type is determined. Though not illustrated, a table or other lookup using the destination address, for example, may be used to determine a destination type.

Various levels of granularity may be implemented using destination types. At a very course level, there are two D_Types, one requiring processing of the file File_In and one not requiring processing. In this case, only one type of processing may be performed. Finer granularity may be useful to determine different processing. In this way, all handhelds need not be treated equally. For example, assume for a particular file type (e.g. PDF from Adobe®) there are three D_Types: desktops (or unknown destinations) may define one type requiring no processing; a first group of handhelds with appropriate viewers define another type requiring processing and a second group of handhelds with different viewers define a further type requiring a different processing.

At step 210, a determination is made whether any processing (i.e. a conversion such as compressing, flattening or changing from one file type to another) is required for the D_Type. If not, via step 212, a message is defined and sent to the destination including the file received, File_In and operations loop to step 206.

If processing/converting is indicated at step 210 then at step 214 File_in is processed in response to the D-Type to provide a File_Out. As discussed below, if File_In was previously processed for the D_Type and the processed file stored to the cache, File_Out may be retrieved to avoid repeating the processing. A UID is generated (step 216). At step 218, File_In and the UID are stored to the cache. Optionally and as shown, the D_Type and File_Out are also stored in association with the UID so that repetitious file processing may be reduced. At step 220, a message is defined for sending to the destination, including the UID and File_Out. Operations 200 loop to step 206 for any further destinations.

Figure 3:
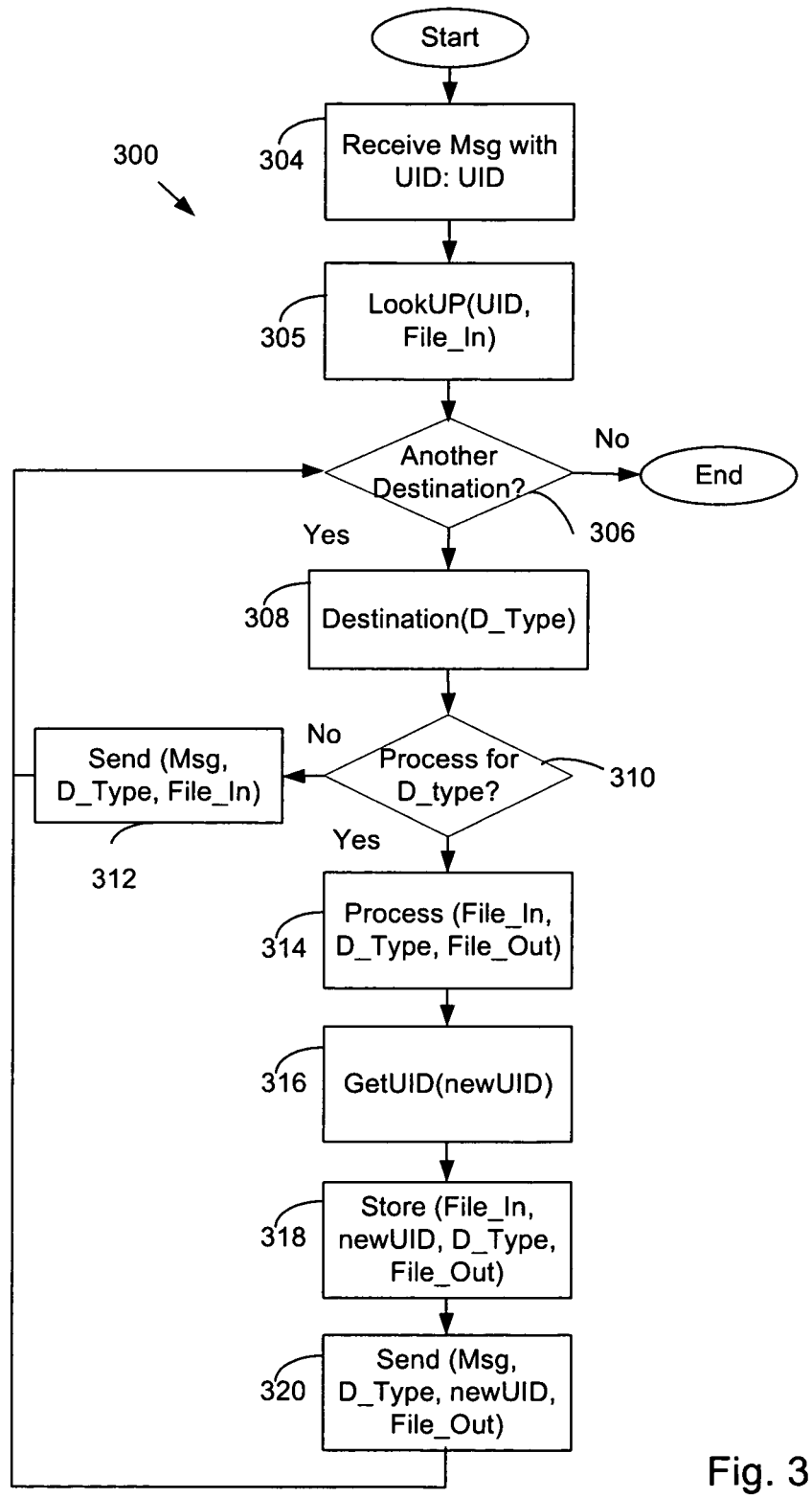
FIG. 3 is a flowchart of operations, in accordance with an embodiment, to communicate a message including a unique ID referencing a file.

FIG. 3 is a flowchart of operations 300, in accordance with an embodiment, to communicate a message including a unique ID referencing a file. Such messages are typically received from handheld devices but may be for communicating to other handhelds or desktops, etc.

At step 304, a message is received with a UID for communicating to at least one destination. At step 305, a lookup of the cache is performed to find the original file, File_In, associated with the UID. Operations 306-320 define a loop for execution, as applicable, for each destination. In the present embodiment, operations 306-320 are the same as operations 206-220. Accordingly, File_In is forwarded to the destination or processed, as necessary for sending with a UID to the destination. Though not illustrated, if at step 305 the lookup using UID fails to return an original file (e.g. LF 120) an error may be returned to the source of the message (e.g. handheld_1 106). The source device may be configured (also not shown) to resend the message with or otherwise provide the file (e.g. SF_1, as applicable) from a local store.

Figure 4:
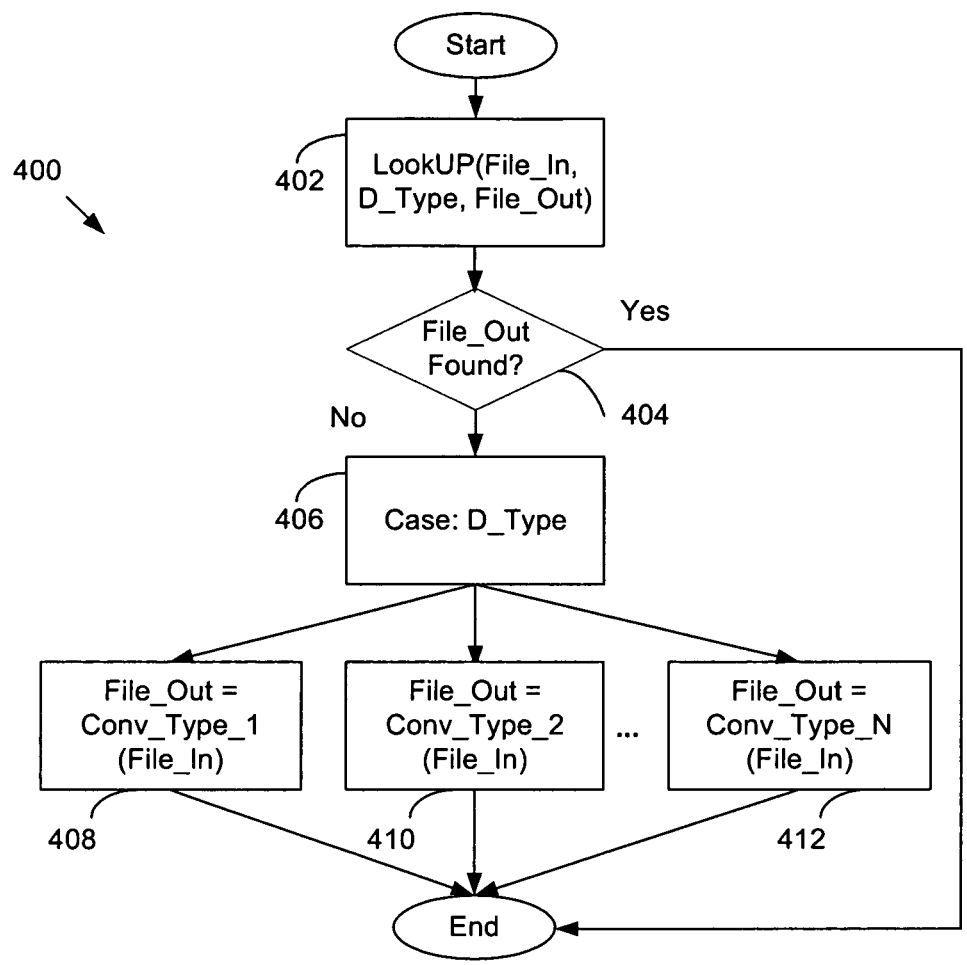
FIG. 4 is a flowchart of operations, in accordance with an embodiment, to process a file for a destination device.

FIG. 4 is a flowchart of operations 400, in accordance with an embodiment, to process a file for a destination device. At step 402, a cache lookup determines and returns the required processed file (File_Out) for the destination type D_Type, if available. If File_Out is available, operations 400 branch at step 404 to return File_Out eliminating a repeated processing of File_In. If File_Out is not available, via branch at step 404 to step 406, in response to the D_Type step 406, particular processing (e.g. 408, 410 . . . 412) may be performed to generate File_Out before operations 400 end.

In certain situations, a destination device may not be able to process a particular file type for a received file or it may be otherwise desirable to not send the file or even a processed file to the destination device (e.g. because it is too large). In situations where the server (file processing system 110) knows the destination device is not capable of handling a specific file type, it may be advantageous to send a UID along with a file type to the destination device, even without the file. The destination device may be configured to determine how to handle the information (e.g. display a stub icon in its place). The user of the destination device can forward the original file (i.e. UID) to another destination device that can process the file if desired. Thus, operations discussed above may be adapted by a person of ordinary skill in the art to send a UID even when the device cannot handle the file type.

Accordingly, the solution described decreases the amount of data transferred over wireless networks, especially when communicating files from the handheld device. The solution also seeks to address the issue of multiple conversions for the same file. Original files and processed files may be server cached. The solution also seeks to provide appropriate file quality for those devices that are capable to use "full size" files as well as those that require or otherwise desire to use lesser files.

As the UID is server generated and stored by the server and device, there is no limit as to which file can be tagged with a UID and shared by means of UID-based file transfer.

Figure 5:
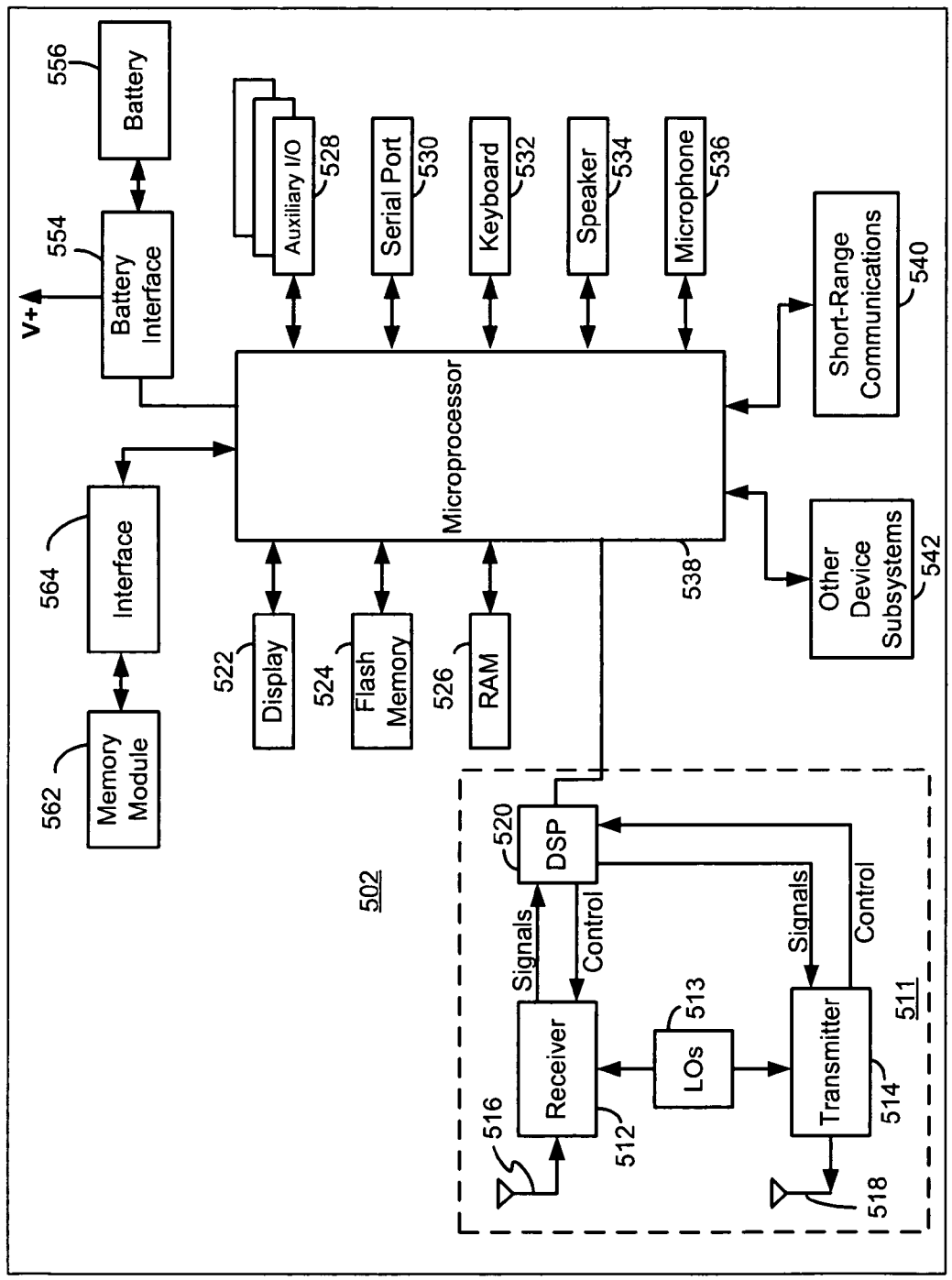
FIG. 5 is an example of a handheld device adapted in accordance with an embodiment.

FIG. 5 is a detailed block diagram of a preferred handheld device 502 adapted in accordance with an embodiment that may be used as handheld_1 106 for example. Handheld device 502 is preferably a two-way communication device having at least voice and advanced data communication capabilities, including the capability to communicate with other computer systems. Depending on the functionality provided by handheld device 502, it may be referred to as a data messaging device, a two-way pager, a cellular telephone with data messaging capabilities, a wireless Internet appliance, or a data communication device (with or without telephony capabilities). Handheld device 502 may communicate with any one of a plurality of base station transceiver systems (not shown) within its geographic coverage area.

Handheld device 502 will normally incorporate a communication subsystem 511, which includes a receiver 512, a transmitter 514, and associated components, such as one or more (preferably embedded or internal) antenna elements 516 and 518, local oscillators (LOs) 513, and a processing module such as a digital signal processor (DSP) 520. As will be apparent to those skilled in field of communications, particular design of communication subsystem 511 depends on the communication network in which handheld device 502 is intended to operate.

Handheld device 502 may send and receive communication signals over the network after required network registration or activation procedures have been completed. Signals received by antenna 516 through the network are input to receiver 512, which may perform such common receiver functions as signal amplification, frequency down conversion, filtering, channel selection, and like, and in example shown in FIG. 5, analog-to-digital (A/D) conversion. A/D conversion of a received signal allows more complex communication functions such as demodulation and decoding to be performed in DSP 520. In a similar manner, signals to be transmitted are processed, including modulation and encoding, for example, by DSP 520. These DSP-processed signals are input to transmitter 514 for digital-to-analog (D/A) conversion, frequency up conversion, filtering, amplification and transmission over communication network via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Network access is associated with a subscriber or user of handheld device 502, and therefore handheld device 502 comprises a memory module 562, such as a Subscriber Identity Module or "SIM" card or a Removable User Identity Module (R-UIM), to be inserted in or connected to an interface 564 in order to operate in the network. Alternatively, memory module 562 may be a non-volatile memory that is programmed with configuration data by a service provider so that mobile station 502 may operate in the network. Since handheld device 502 is a mobile battery-powered device, it also includes a battery interface 554 for receiving one or more rechargeable batteries 556. Such a battery 556 provides electrical power to most if not all electrical circuitry in handheld device 502, and battery interface 254 provides for a mechanical and electrical connection for it. The battery interface 554 is coupled to a regulator (not shown in FIG. 5) that provides power V+ to all of the circuitry.

Handheld device 502 includes a microprocessor 538 that controls overall operation of mobile station 502. Communication functions, including at least data and voice communications, are performed through communication subsystem 511. Microprocessor 538 also interacts with additional device subsystems such as a display 522, a flash memory 524, a random access memory (RAM) 526, auxiliary input/output (I/O) subsystems 528, a serial port 530, a keyboard 532, a speaker 534, a microphone 536, a short-range communications subsystem 540, and any other device subsystems generally designated at 542. Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list. Operating system software used by microprocessor 538 is preferably stored in a persistent store such as flash memory 524, which may alternatively be a read-only memory (ROM) or similar storage element (not shown). Those skilled in the art will appreciate that the operating system, specific device applications, or parts thereof, may be temporarily loaded into a volatile store such as RAM 526.

Microprocessor 538, in addition to its operating system functions, preferably enables execution of software applications on handheld device 502. A predetermined set of applications that control basic device operations, including at least data and voice communication applications, will normally be installed on handheld device 502 during its manufacture. A preferred application that may be loaded onto handheld device 502 may be a personal information manager (PIM) application having the ability to organize and manage data items relating to user such as, but not limited to, e-mail, calendar events, voice mails, appointments, and task items. Naturally, one or more memory stores are available on handheld device 502 and SIM 562 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on handheld device 502 with respect to such items. This is especially advantageous where the host computer system is the mobile station user's office or enterprise computer system. Additional applications may also be loaded onto handheld device 502 through network, an auxiliary I/O subsystem 528, serial port 530, short-range communications subsystem 540, or any other suitable subsystem 542, and installed by a user in RAM 526 or preferably a non-volatile store (not shown) for execution by microprocessor 538. Such flexibility in application installation increases the functionality of handheld device 502 and may provide enhanced on-device functions, communication-related functions, or both. For example, secure communication applications may enable electronic commerce functions and other such financial transactions to be performed using handheld device 502.

In a data communication mode, a received signal such as a text message, an e-mail message, or web page download will be processed by communication subsystem 511 and input to microprocessor 538. Microprocessor 238 will preferably further process the signal for output to display 522 or alternatively to auxiliary I/O device 528. A user of handheld device 502 may also compose data items, such as e-mail messages, for example, using keyboard 532 in conjunction with display 522 and possibly auxiliary I/O device 528. Keyboard 532 is preferably a complete alphanumeric keyboard and/or telephone-type keypad. These composed items may be transmitted over a communication network through communication subsystem 511.

For voice communications, the overall operation of handheld device 502 is substantially similar, except that the received signals would be output to speaker 254 and signals for transmission would be generated by microphone 536. Alternative voice or audio I/O subsystems, such as a voice message recording subsystem, may also be implemented. Although voice or audio signal output is preferably accomplished primarily through speaker 534, display 522 may also be used to provide an indication of the identity of a calling party, duration of a voice call, or other voice call related information, as some examples.

Serial port 530 in FIG. 5 is normally implemented in a personal digital assistant (PDA)-type communication device for which synchronization with a user's desktop computer is a desirable, albeit optional, component. Serial port 530 enables a user to set preferences through an external device or software application and extends the capabilities of handheld device 502 by providing for information or software downloads to handheld device 502 other than through a wireless communication network. The alternate download path may, for example, be used to load an encryption key onto handheld device 502 through a direct and thus reliable and trusted connection to thereby provide secure device communication.

Short-range communications subsystem 540 is an additional optional component that provides for communication between handheld device 502 and different systems or devices, which need not necessarily be similar devices. For example, subsystem 540 may include an infrared device and associated circuits and components, or a Bluetooth™ communication module to provide for communication with similarly enabled systems and devices. Bluetooth™ is a registered trademark of Bluetooth SIG, Inc.

Handheld devices 502 may be adapted such as via software (instructions and data) to handle UIDs as described above. A UID received with a message may be persisted to the device (e.g. in association with the message). When the message is forwarded to a user, any received processed file may be omitted from the forwarded message and the UID sent as a proxy for the original file. For example, if the message received and to be forwarded is an email, the UID may define as a header field of the email, a portion of the body or as an attachment in accordance with email protocols. An email application on handheld device 502 may be adapted to remove the received processed file when forwarding the message.

Although embodiments have been described herein, it will be understood by those skilled in the art that variations may be made thereto without departing from their spirit or the scope of the appended claims.

What is claimed is:

1. A method of communicating data items on behalf of a first device to one or more second devices coupled to a communication network via a file processing system in the communication network, the file processing system being interposed between said first device and said one or more second devices, said method comprising:

the file processing system intercepting an original data item during an original communication, the original communication having been sent by an originating device to the first device via the file processing system using the communication network;

the file processing system associating a unique ID with the original data item;

the file processing system caching the original data item and the unique ID to enable the original data item to be referenced using the unique ID;

the file processing system sending the unique ID and the original data item to the first device in completing the original communication associated with the original data item, provision of the unique ID to the first device enabling the first device to have the file processing system send the original data item or a processed version thereof on its behalf in subsequent communications;

in a subsequent communication by the source to said one or more destinations via the file processing system using the communication network, the file processing system receiving the unique ID from the first device instead of the original data item and a request to send the original data item or a processed version thereof to said one or more second devices;

the file processing system using the received unique ID to access the original data item;

the file processing system determining whether the one or more second devices are capable of handling a file type associated with the original data item;

the file processing system sending to at least one of the one or more second devices capable of handling said file type, on behalf of the first device, either the original data item or a processed data item according to the capabilities of respective ones of the one or more second devices determined by the file processing system; and the file processing system sending to at least one second device not capable of handling said file type, the unique ID and an indication of the file without the original data item itself.

2. The method according to claim 1, further comprising:

the file processing system determining based on the first device, if the original data item requires processing and, if so, obtaining a first processed data item;

the file processing system sending the original data item or the first processed data item along with the unique ID to complete the original communication;

the file processing system determining based on said one or more second devices, if the original data item requires processing and, if so, obtaining the first processed data item or a second processed data item; and the file processing system sending to the one or more second devices, the original data item, the first processed data item, or the second processed data item.

3. The method according to claim 2 further comprising the file processing system generating the first or second processed data items or both for the one or more second devices and generating new unique IDs for the first or second processed data items or both.

4. The method according to claim 3 comprising the file processing system caching the first or second processed data items or both in association with the new unique IDs for subsequent reuse to eliminate repeating said step of processing the original data item.

5. The method according to claim 1 wherein the processing of the original data item and the sending to the one or more second devices are performed in response to a type of a second device.

6. The method according to claim 1 further comprising the file processing system generating the unique ID.

7. A file processing system in a communication network for communicating data items on behalf of a first device to one or more second devices coupled to the communication network, the file processing system being interposed between said first device and said one or more second devices, the file processing system comprising:

a communications subsystem for communicating data items; and a processor and a memory storing computer executable instructions and data to configure the system to:

intercept an original data item during an original communication, the original communication having been sent by an originating device to the first device via the file processing system using the communications network;

associate a unique ID with the original data item;

cache the original data item and the unique ID to a data store coupled to the system to enable the original data item to be referenced using the unique ID;

send the unique ID and the original data item to the first device in completing the original communication associated with the original data item, provision of the unique ID to the first device enabling the first device to have the file processing system send the original data item or a processed version thereof on its behalf in subsequent communications;

in a subsequent communication by the first device to said one or more second devices via the file processing system using the communications network, receive the unique ID from the first device instead of the original data item and receive a request to send the original data item or a processed version thereof to said one or more second devices;

use the received unique ID to access the original data item;

determine whether the one or more second devices are capable of handling a file type associated with the original data item;

send to at least one of the one or more second devices capable of handling said file type, on behalf of the first device, either the original data item or a processed data item according to the capabilities of respective ones of the one or more second devices determined by the file processing system; and send to at least one second device not capable of handling said file type, the unique ID and an indication of the file without the original data item itself.

8. The system according to claim 7, further comprising instructions and data to configure the system to:

determine based on the first device, if the original data item requires processing and, if so, obtain a first processed data item;

send the original data item or the first processed data item along with the unique ID to complete the original communication;

determine based on said one or more second devices, if the original data item requires processing and, if so, obtain the first processed data item or a second processed data item; and send to the one or more second devices, the original data item, the first processed data item, or the second processed data item.

9. The system according to claim 8 further comprising instructions and data to configure the system to generate the first or second processed data items or both for the one or more second devices and generate new unique IDs for the first or second processed data items or both.

10. The system according to claim 9 further comprising instructions and data to configure the system to cache the first or second processed data item in association with the new unique IDs for subsequent reuse to eliminate repeating said step of processing the original data item.

11. The system according to claim 7 wherein the instructions and data to configure the system to process the original data item and send the processed data item are responsive to a type of a second device.

12. The system according to claim 7 further comprising instructions and data to generate the unique ID.

13. A non-transitory computer readable medium comprising computer executable instructions which when executed by a processor adapt a communications network system for communicating data items on behalf of a first device to one or more second devices via a file processing system in the communication network, the file processing system being interposed between said first device and said one or more second devices, said computer readable medium comprising instructions for having said file processing system:

intercept an original data item during an original communication, the original communication having been sent by an originating device to the first device via the file processing system using the communications network;

associate a unique ID with the original data item;

cache the original data item and the unique ID to a data store coupled to the system to enable the original data item to be referenced using the unique ID;

send the unique ID and the original data item to the first device in completing the original communication associated with the original data item, provision of the unique ID to the first device enabling the first device to have the file processing system send the original data item or a processed version thereof on its behalf in subsequent communications;

in a subsequent communication by the first device to said one or more second devices via the file processing system using the communications network, receive the unique ID from the first device instead of the original data item and receive a request to send the original data item or a processed version thereof to said one or more second devices;

use the received unique ID to access the original data item;

determine whether the one or more second devices are capable of handling a file type associated with the original data item;

send to at least one of the one or more second devices capable of handling said file type, on behalf of the first device, either the original data item or a processed data item according to the capabilities of respective ones of the one or more second devices determined by the file processing system; and send to at least one second device not capable of handling said file type, the unique ID and an indication of the file without the original data item itself.

14. The non-transitory computer readable medium according to claim 13, further comprising instructions for having said file processing system:

determine based on the first device, if the original data item requires processing and, if so, obtain a first processed data item;

send the original data item or the first processed data item along with the unique ID to complete the original communication;

determine based on said one or more second devices, if the original data item requires processing and, if so, obtain the first processed data item or a second processed data item; and send to the one or more second devices, the original data item, the first processed data item, or the second processed data item.

15. The computer readable medium according to claim 14 further comprising instructions for having said file processing system generate the first or second processed data items or both for the one or more second devices and generate new unique IDs for the first or second processed data items or both.

16. The computer readable medium according to claim 15 further comprising instructions for having said file processing system cache the first or second processed data items or both in association with the new unique IDs for subsequent reuse to eliminate repeating said step of processing the original data item.

17. The computer readable medium according to claim 13, wherein said instructions of processing and sending are performed in response to a type of a second device.

18. The computer readable medium according to claim 13 further comprising instructions for having said file processing system generate the unique ID.

19. A method in a first communications device for having a file processing system in a communication network communicate data items on its behalf to one or more second devices, the file processing system being interposed between the first device and the one or more second devices, the first device comprising a communications subsystem for communicating messages comprising data items via the communication network, a storage device for storing instructions and data, and a processor coupled to the storage device and the communication subsystem, the storage device storing instructions and data for carrying out the method, the method comprising:

during an original communication associated with an original data item having been sent by an originating device to the first device and intercepted and cached by the file processing system with a unique ID, the first device receiving a message comprising the unique ID and the original data item in completion of the original communication, provision of the unique ID enabling the first device to have the file processing system determine whether the one or more second devices are capable of handling a file type associated with the original data item and send the original data item or a processed version thereof on its behalf in subsequent communications, the unique ID having been generated to enable the file processing system to identify the original data item stored to a cache in the file processing system; and in a subsequent communication to the one or more second devices via the file processing system using the communications network, the first device returning the unique ID to the file processing system over the communications network instead of the original data item with a request to send the original data item or a processed version thereof to the one or more second devices according to the capabilities of the one or more second devices determined by the file processing system to thereby to reduce communication of the original data item about the communication network, the file processing system being enabled to process the original data item for the one or more second devices and send the original data item or the processed version thereof to at least one of the one or more second devices capable of handling said file type, and to send to at least one second device not capable of handling said file type, the unique ID and an indication of the file without the original data item itself.

20. The method according to claim 19 further comprising configuring the processor to store the unique ID for subsequent communication as a proxy for the original data item.

21. A first communications device for having a file processing system in a communication network communicate data items on its behalf to one or more second devices, the file processing system being interposed between the first device and the one or more second devices, the first device comprising a communications subsystem for communicating messages comprising data items via the communication network, a storage device for storing instructions and data, and a processor coupled to the storage device and the communication subsystem, the storage device storing instructions and data for:

during an original communication associated with an original data item having been sent by an originating device to the first device and intercepted and cached by the file processing system with a unique ID, the first device receiving a message comprising the unique ID and the original data item in completion of the original communication, provision of the unique ID enabling the first device to have the file processing system determine whether the one or more second devices are capable of handling a file type associated with the original data item and send the original data item or a processed version thereof on its behalf in subsequent communications, the unique ID having been generated to enable the file processing system to identify the original data item stored to a cache in the file processing system; and in a subsequent communication to the one or more second devices via the file processing system using the communications network, the first device returning the unique ID to the file processing system over the communications network instead of the original data item with a request to send the original data item or a processed version thereof to the one or more second devices according to the capabilities of the one or more second devices determined by the file processing system to thereby to reduce communication of the original data item about the communication network, the file processing system being enabled to process the original data item for the one or more second devices and send the original data item or the processed version thereof to at least one of the one or more second devices capable of handling said file type, and to send to at least one second device not capable of handling said file type, the unique ID and an indication of the file without the original data item itself.

* * * * *